(12) United States Patent  
Newcombe

(10) Patent No.: US 6,745,249 B1  
(45) Date of Patent: Jun. 1, 2004

(54) ENABLING LIFE CYCLE SEMANTICS VIA NAMING INTERFACES

(75) Inventor: Russell Ley Newcombe, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 09/605,780

(22) Filed: Jun. 28, 2000

(51) Int. Cl.[7] ................................................. G06F 9/46
(52) U.S. Cl. ...................................................... 709/315
(58) Field of Search ......................................... 709/315

(56) References Cited

U.S. PATENT DOCUMENTS 5,948,072 A * 9/1999 Cink et al. .................. 709/330
6,016,514 A * 1/2000 Cink et al. .................. 709/315
6,418,447 B1 * 7/2002 Frey et al. .............. 707/103 R

OTHER PUBLICATIONS

Matthew D. Verminski, A Distributed Software Architecture for Semiconductor Process Design, Jun., 16, 1997.*

* cited by examiner

Primary Examiner—John Follansbee
Assistant Examiner—Lechi Truong
(74) Attorney, Agent, or Firm—Robert V. Wilder; David A. Mims, Jr.

(57) ABSTRACT

A method and implementing system are provided in which CORBA (Common Object Request Broker Architecture) Life Cycle Service factory finding capabilities are combined with CORBA Naming Service resolve operations on a naming context. The methodology provides a performance enhancement when compared with a typical CORBA programming model usage of these two services. In addition, EJBHomes in a distributed network are allowed to be found using CORBA Life Cycle Services while maintaining support for the EJB (Enterprise Java Bean) programming model of using JNDI (Java Naming and Directory Interface) lookup calls to locate EJBHomes. Usage of Life Cycle Service semantics is provided in an EJB environment for finding object factories while having access to only Naming interfaces.

13 Claims, 5 Drawing Sheets

ENABLING LIFE CYCLE SEMANTICS VIA NAMING INTERFACES

FIELD OF THE INVENTION

The present invention relates generally to information processing systems and more particularly to a methodology and implementation for finding references to objects in a distributed object-oriented network environment.

BACKGROUND OF THE INVENTION

The development of application and system software for information processing systems has traditionally been a time-consuming and somewhat repetitive task, with software developers often having to write and re-write code to perform well known user interface and system functions in addition to writing the code optimized to implement the desired new functionality. Object-oriented programming (OOP) has emerged as a dominant programming paradigm that enables the rapid development and implementation of functionality while permitting the customization and re-use of software "objects".

The power of OOP as a software development philosophy is realized chiefly through object frameworks which provide a collection of base object classes that can be selectively utilized by a system developer to create a software system, much like a hardware developer might construct a desktop computer from standard hardware components. Object frameworks are particularly advantageous when utilized within a distributed computing environment in which multiple, and possibly heterogeneous or dissimilar computer systems are interconnected to allow system hardware and software resources to be shared between computer systems. In order to permit programs written in multiple diverse languages to utilize object classes defined within a single object framework, it is necessary to develop a minimum level of object standardization to enable the inter-operability of object-oriented software. One organization that is working to establish industry guidelines and object management specifications to provide a common object framework for application development is the Object Management Group (OMG).

The specifications promulgated by the OMG enable the reusability, portability and interoperability of object-based software in heterogeneous distributed computing environments. An example of a commercially available object framework that conforms to OMG specifications is contained in the WebSphere Enterprise Edition Component Broker, Version 3.0, available from International Business Machines Corporation.

The OMG is an international consortium of organizations involved in various aspects of client/server computing on heterogeneous platforms such as shown in FIG. 1. The OMG has set forth published standards by which clients communicate in OOP form with servers. As part of these standards, an Object Request Broker has been defined as part of the Common Object Request Broker Architecture (CORBA). CORBA defines the object-oriented bridge between the client and the server. The object request broker (ORB) de-couples the client and server applications from the object-oriented implementation details.

The OMG defines an industry standard for "Object Services" in a document referred to as "CORBAservices: Common Object Services Specification", which is included herein by reference. The OMG Object Services Specification includes a series of chapters specifying a variety of services for use in CORBA systems. Such service specifications include, inter alia, a "Naming Service" Specification 97-12-10, and "Life Cycle Service" Specification 97-12-13.

In a distributed object-oriented environment, there is a need to be able to locate references to objects. The OMG Naming Service provides such a mechanism, by allowing an object to be located by the use of a human-readable name. A naming service provides a one-to-one mapping from a human-readable name to an object instance.

Another mechanism provided to locate object reference in a distributed object-oriented environment is by use of the FactoryFinder interface defined in the OMG Life Cycle Service. A factory finder provides a standard service that can be utilized by applications to locate a Factory object, i.e. an object that is used-to create instances of other objects, within the heterogeneous distributed object-oriented computing environment. The Life Cycle Service provides a mechanism for finding factories anywhere in a distributed environment, where the factories are identified by the interface supported by the objects which the factories create rather than by a simple name.

In an environment where both Naming and Life Cycle FactoryFinder services are provided (such as the OMG CORBA programming model), both services are often used together to enable a client or user to locate object factories. The client uses the Naming Service to locate a Life Cycle Service FactoryFinder object, and then uses the Factory-Finder object to locate an object factory.

Another major force within the distributed object-oriented industry are the Java specifications from Sun Microsystems. Among the specifications provided is "The Enterprise Java-Beans Specification, Version 1.0" which provides a server-side architecture for the deployment of objects in a distributed object-oriented environment. Also, there is a Java Naming and Directory (JNDI) specification that provides interfaces to be used to allow Java objects to make use of various Naming and Directory implementations. These specifications define how JNDI can be used to find factories for Enterprise JavaBeans. The WebSphere Enterprise Edition Component Broker Version 3.0 from IBM (mentioned earlier as providing an available implementation of CORBA) is also an example of a commercially available implementation of these Java specifications.

To further elaborate, the EJB specification defines an interface called a "Home" that serves as a factory for EJB objects. The specification defines how to use JNDI to find references to Homes in the distributed object-oriented environment. A common approach to implementation of naming services in an EJB environment is to have the JNDI interface layered over the OMG Naming Service.

The Java specifications do not provide for a service similar to the Life Cycle Service defined by the OMG. However, in a distributed object-oriented environment, there are advantages to using Life Cycle Services rather than naming services to locate object factories. Because factory finder objects find object factories based on specified selection criteria (i.e. type of objects the factory creates) rather than by specific name, factory finders provide a level of indirection between the client and the dynamically changing distributed environment in which the object factories exist. Thus, instead of finding a specifically named object as is done in a naming service, a factory finder finds object factories that meet the specified input criteria. This level of indirection enables more complex distribution scenarios while protecting the client code from having to change whenever the environment is reconfigured and additional named objects are installed.

However, an EJB client cannot currently take advantage of the superior Life Cycle semantics for locating object factories (i.e. Homes), even when the EJB environment is layered on top of a CORBA environment which provides Life Cycle services. Thus, there is a need for an improved methodology and implementing system which enables the utilization of Life Cycle Semantics for finding EJBHomes in a distributed information processing environment.

SUMMARY OF THE INVENTION

A method and implementing system are provided to enable the usage of Life Cycle service semantics in an EJB environment for finding object factories (i.e. EJBHomes) while having access to only naming interfaces.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
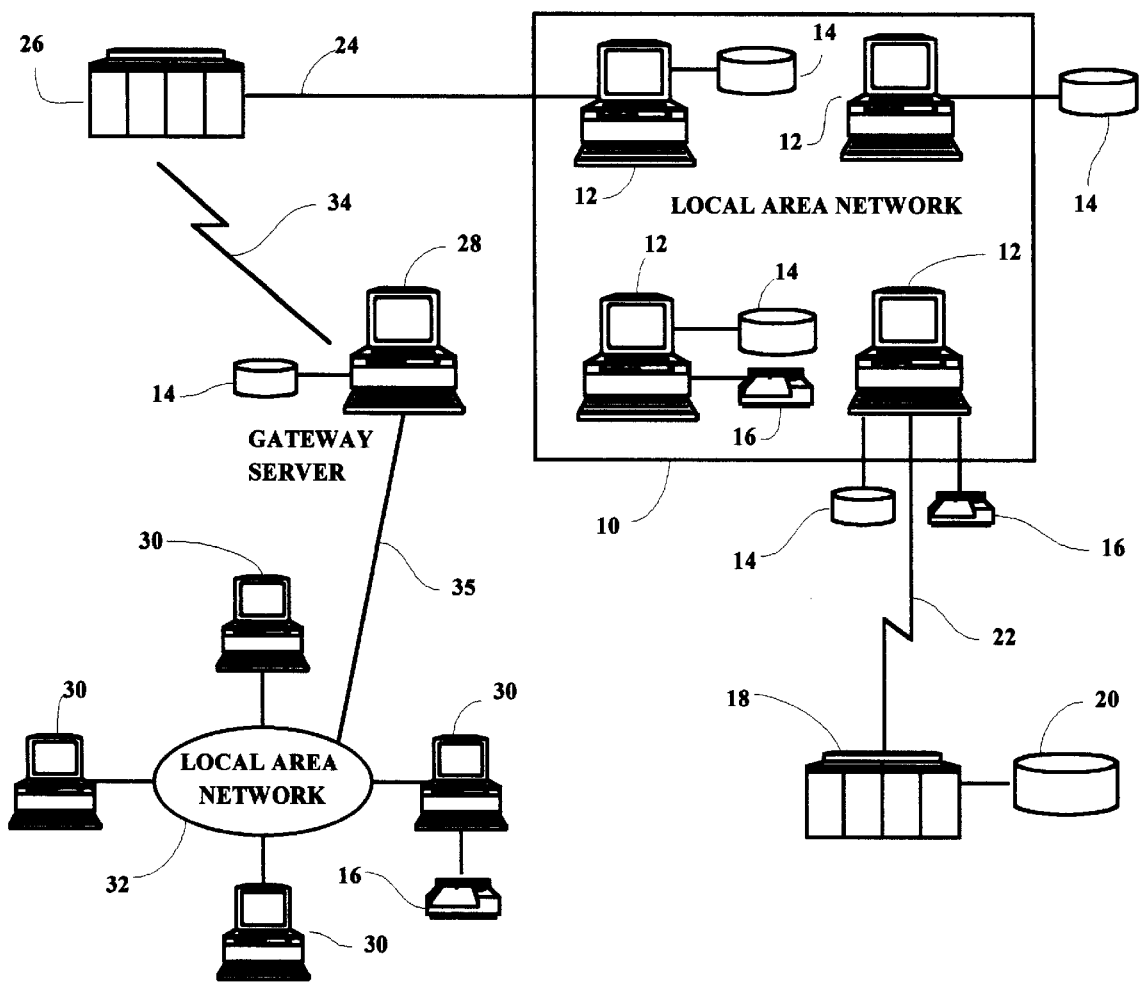
FIG. 1 is an illustrative embodiment of a heterogeneous distributed information processing system in accordance with the present invention.

The various methods discussed herein may be implemented within an exemplary distributed information processing system as illustrated in FIG. 1. As shown, an information processing system contains a plurality of networks including Local Area Networks (LAN) 10 and 32, each of which preferably includes a plurality of individual computers 12 and 30, respectively. One skilled in the art will appreciate that a plurality of workstations coupled to a host processor may be utilized for each such LAN. As is common in such processing systems, each computer 12 and 30, may be coupled to a storage device 14 and a printer 16.

The exemplary processing system further includes one or more mainframe computers, such as mainframe computer 18, which may be preferably coupled to LAN 10 by means of a communications link 22. Mainframe computer 18 is preferably coupled to a storage device 20, which serves as remote storage for LAN 10. LAN 10 is also coupled via communications link 24 through communications controller 26 and communications link 34 to gateway server 28. Gateway server 28 is preferably a workstation which serves to link LAN 32 to LAN 10 via communications link 35. As understood by one skilled in the art, the illustrated processing system further includes un-illustrated additional gateways, routers, bridges and various other network hardware utilized to interconnect the various segments of the exemplary processing system.

Figure 2:
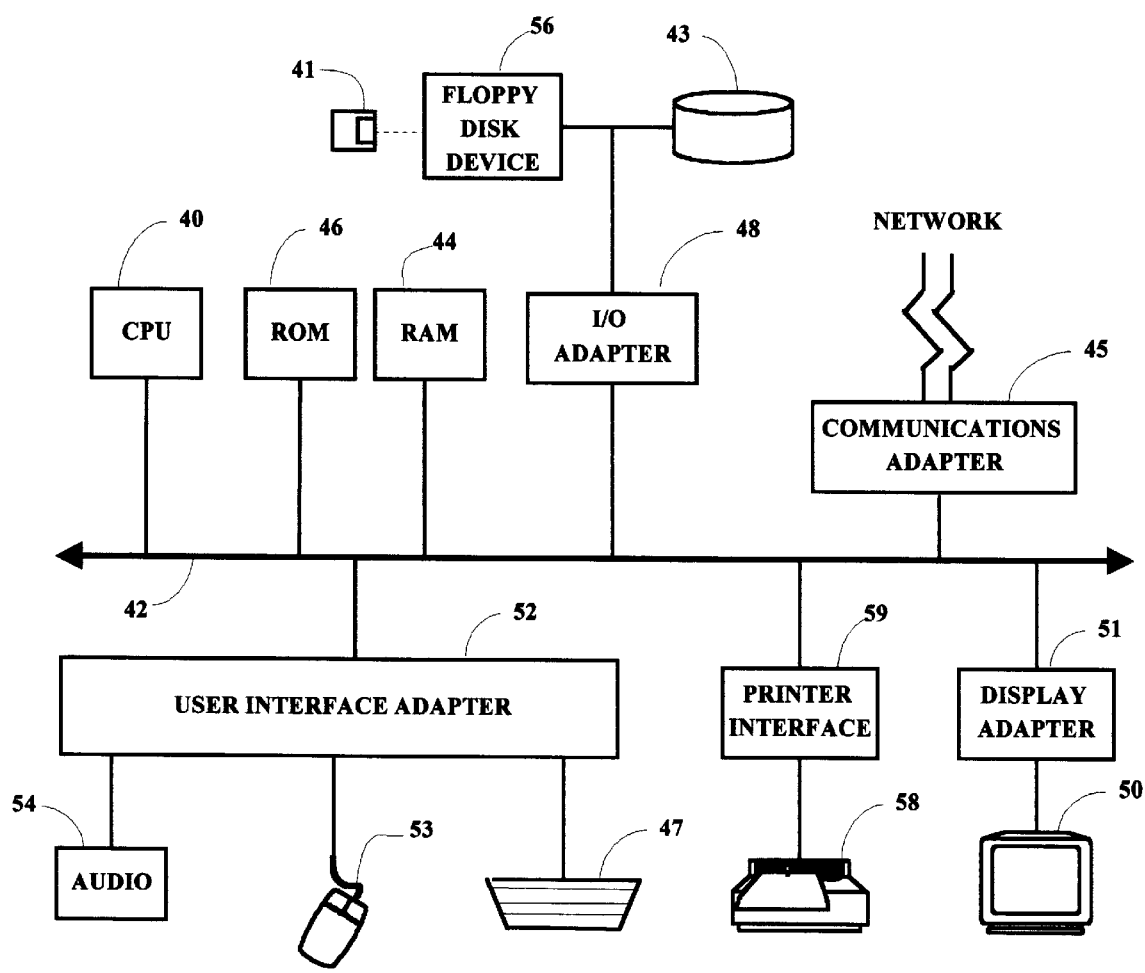
FIG. 2 is a schematic block diagram of a computer/workstation within the distributed information processing system shown in FIG. 1.

Referring to FIG. 2, there is shown a pictorial representation of a workstation having a central processing unit (CPU) 40 such as a conventional microprocessor, and a number of other units interconnected via a system bus 42. The exemplary workstation shown in FIG. 2 further includes a Random Access Memory (RAM) 44, a Read-Only Memory (ROM) 46, an input/output (I/O) adapter 48 for connecting peripheral devices such as storage unit 43 and floppy disk device 56 to the bus 42. A user interface adapter 52 is shown connecting a keyboard 47, a mouse 53 and an audio system 54 (which may include speakers and microphones) to the bus 42. Other devices such as a touch-screen input device (not shown) may also be connected to the bus 42 through the user interface adapter 52. A communications adapter 45 is shown in the example connecting the bus 42 to one or more networks, and a display adapter 51 connects a display device 50 to the main bus 42. The computer software embodiment of the present invention may be included as a software toolkit installed on one of the workstations within the distributed environment illustrated. One skilled in the art will appreciate that the procedures associated with the present invention may be in the form of a computer program product on a computer readable medium, which may be temporarily or permanently loaded on the illustrated workstation in disk storage 43, floppy disk 41 or RAM 44.

Figure 3:
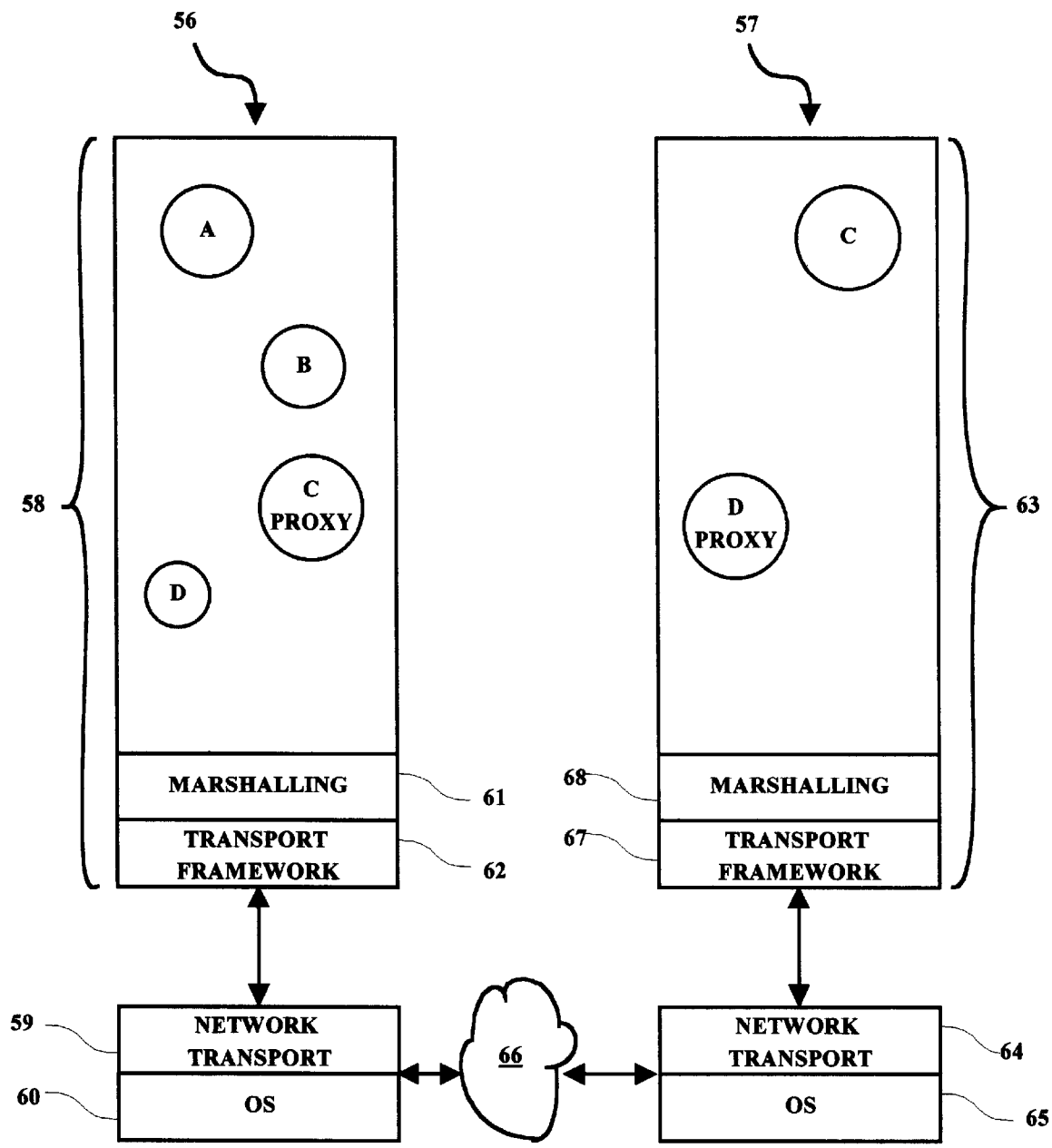
FIG. 3 is a pictorial representation of an exemplary generalized software configuration of two nodes within a heterogeneous distributed object-oriented computing environment.

In FIG. 3, there is illustrated a generalized software configuration of two nodes 56 and 57 within a heterogeneous distributed computing environment such as an information processing system. As illustrated, nodes 56 and 57, which can comprise two of computers 12 within information processing system, execute software under the control of possibly diverse operating systems 60 and 65, respectively. Although diverse operating systems may be utilized by nodes 56 and 57, intercommunication between nodes 56 and 57 via network 66 is facilitated by network transport layers 59 and 64, which can comprise Transport Control Protocol/Interface Program (TCP/IP), for example. The software configuration of nodes 56 and 57 further comprise a distributed object environment 58 and 63, including software objects A, B, C and D. To illustrate the interaction of objects A–D within distributed object environment 58 and 63, assume that object A invokes a method on objects B and C, passing object D as a parameter, and that objects B and C belong to the same class. If object A calls object B, a local object, all of the interaction between objects A, B and D occurs within the same local process and is controlled strictly by the dispatching and reference mechanisms of the local process. On the other hand, if object A calls object C, with C being a remote object, the call is directed to object C proxy, which interacts with marshalling code 61 and transport framework 62 to package the call parameters into a message having a format suitable for transmission over network 66. In response to receipt of the message at node 57, network transport 64 passes the message to transport framework 67 and marshalling code 68, which de-marshals the parameters to re-construct the call of object C. Thereafter, an object D proxy is created and object C is called in the same manner as if object C were local to object A. Any requests from object C to object D are similarly handled through object D proxy. As can be seen from the above description of a distributed object environment, an object can transparently interact with other objects within the distributed object environment without regard to whether the other objects reside at a local or remote node or whether the objects are within the same process.

Figure 4:
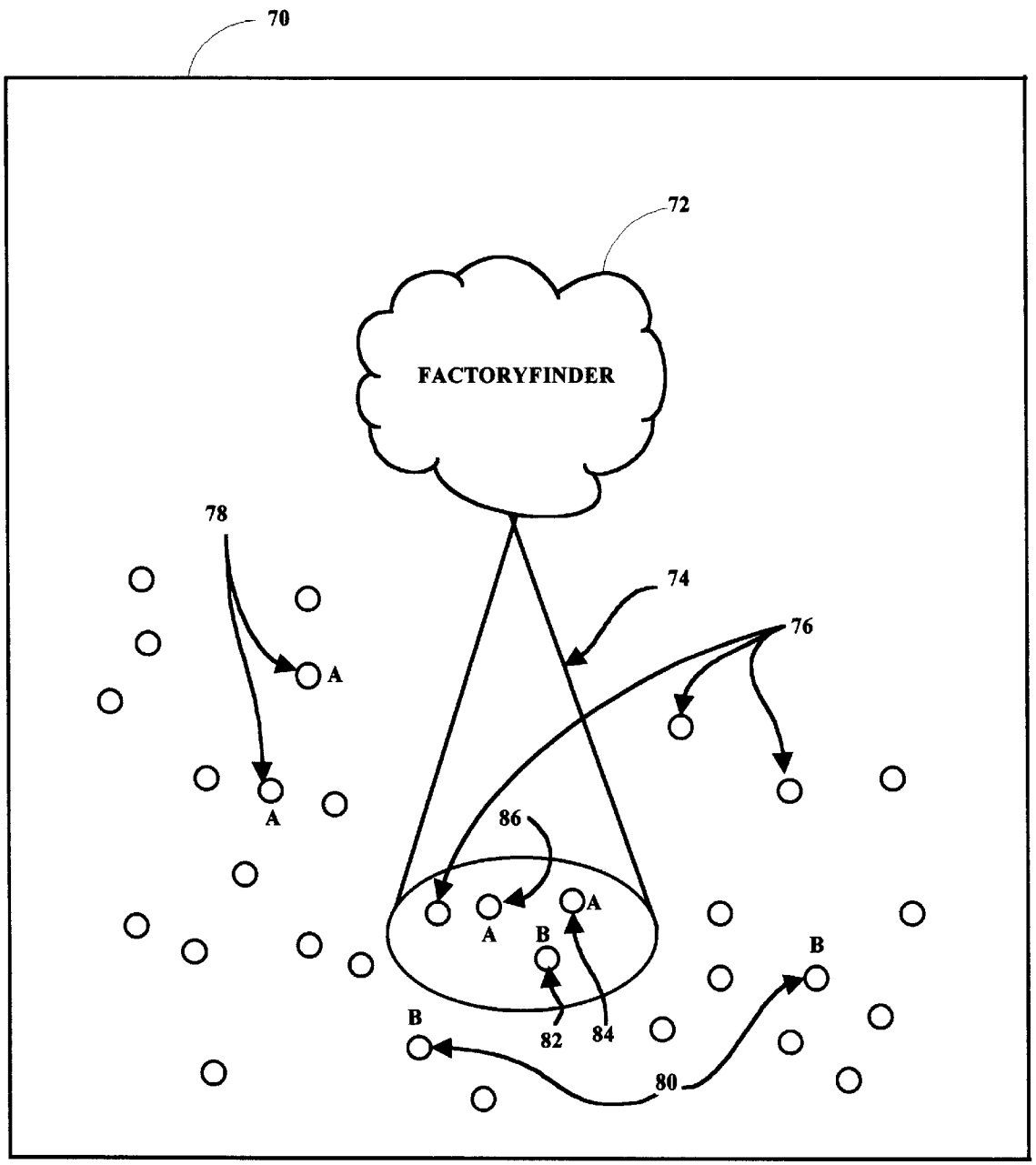
FIG. 4 is an illustration showing a FactoryFinder function within a distributed domain.

In FIG. 4, there is illustrated the Life Cycle Service Factory Finding as defined by the OMG and as implemented in the environment for the preferred embodiment. As illustrated, there is shown a representation of a FactoryFinder's scope as defined by the OMG Life Cycle Service. A distributed domain 70 contains factory objects 76 which are used for creating objects within the domain. These factory objects create objects of different types, such as type A objects 78, 84, 86 and type B objects 80, 82. The distributed domain 70 also contains a FactoryFinder object 72 which is capable of finding factories within a particular scope 74 of the distributed domain 70. CORBA FactoryFinders are configured so as to only consider a portion of the entire distributed environment when looking for a factory. Thus, the FactoryFinder defines "where" to look. When a FactoryFinder 72 processes a client request, it is the client that tells the FactoryFinder 72 what to look for within its scope 74. For example, if FactoryFinder 72 was asked to find a factory of A objects 78, 84, and 86, the FactoryFinder 72 would return one of the factories for A objects 84, 86 within its scope 74 but would not return the factory for A object 78 which is outside of the scope 74 of the FactoryFinder 72. Thus, a FactoryFinder 72 encapsulates "where" to look in the distributed domain 70 and the client's request defines "what" the FactoryFinder 72 should look for.

In accordance with the following detailed discussion, Life Cycle service factory finding capabilities are combined with naming service resolve operations on a naming context such that EJBHomes are able to be found in an EJB environment via Life Cycle services while at the same time, the EJB programming model is supported using JNDI lookup calls to locate EJBHomes.

The model of doing a JNDI lookup provides a one-to-one mapping from an input name to a particular EJBHome instance. In a production level distributed environment such as that shown in FIG. 1, there may be many EJBHomes supporting the same type of EJB. In accordance with the present disclosure, applications are not required to request a specific instance of a home. Further, as configuration changes are made within the system, applications do not have to be changed and/or re-deployed to specify a different instance of an EJBHome. The Life Cycle service provides a level of indirection and abstraction which allows the application to request a home that is within a particular scope of location within the distributed environment, while at the same time allowing the application to be isolated from the specifics of the exact configuration of the environment.

Factory finders are configured so as to only consider a portion of the entire distributed environment when looking for a factory. Thus, the factory finder defines "where" to look and the client request defines "what" to look for. The factory finder can embody abstractions of "where" such as "resources owned by my department". When my department adds or removes resources, the configuration of that factory finder is updated and the client code which uses that factory finder does not have to change. In addition, there may be multiple homes which satisfy the "what" comprising the client's request. The factory finding approach allows the client request to be broad, for example to retrieve a home which supports policy objects, or much more specific, for example to retrieve a home which supports persistent policy objects backed by a specified database.

To illustrate an exemplary implementation of the present invention, there is shown sample code showing how factories are found using a CORBA programming model that uses both OMG Naming and Life Cycle services. Next, there is shown sample code showing how EJBHomes are typically found using JNDI. With those examples as background, it is then disclosed how EJBHomes are found using JNDI while obtaining Life Cycle semantics according to the present invention.

In the exemplary CORBA programming model illustrated below (whose factories are also called Homes), the client wants to obtain a home located on the bootstrap host, the objects of which support the Policy interface.

1. // Get the factory finder scoped to the bootstrap host
2. obj=CBSeriesGlobal.nameService( ). resolve_with_ string("host/resources/factory-finders/host-scope");
3. factoryFinder=FactoryFinderHelper.narrow(obj);
4. // Get any home that supports Policy objects
5. obj=factoryFinder.find_factory_from_string ("Policy.object interface");
6. policyHome=PolicyHomeHelper.narrow(obj);

In the above example, the string "host/resources/factoryfinders/host-scope" in line 2 can be interpreted to mean the factory finder which looks for factories on the bootstrap host. By replacing that string in line 2, other definitions of "where" can be controlled by the client.

For example, to look for factories on host xyz.austin.ibm.com, independent of my bootstrap host, the following code may be used:

"cell/hosts/xyz.austin.ibm.com/resources/factory-finders/ host-scope".

To look for factories in the default workgroup of my bootstrap host, the following code may be used:

"workgroup/resources/factory-finders/workgroup-scope".

To look for factories in workgroup "myWG", independent of my bootstrap host's default workgroup, the following code may be used:

"cell/workgroups/myWG/resources/factory-finders/ workgroup-scope".

To look for factories in server "myserver" when it is known that "myserver" is on my bootstrap host, the following code may be used: "host/resources/factory-finders/ myServer-server-scope".

To look for factories in myserver when it is not certain what host it is on, the following code may be used:

"cell/resources/factory-finders/myServer-server-scope".

To look for factories in myserver when it is known to be on my bootstrap host, and if the factory can not be found there, to look at other servers on my bootstrap host, and if it can't be found there, to look in the default workgroup, and if it can't be found there, to look in the cell, the following code may be used:

"host/resources/factory-finders/myServer-server-scope-widened".

In addition to the above, programmers and administrators can define additional factory finders that provide abstractions of location information relevant to their applications and/or installation. For example, an administrator could define a factory finder which defined all of the hosts in "Dept 21F" and bind it into the name space at the cell level. In that case, the string used in the resolve would be similar to:

"cell/resources/factory-finders/Dept21F".

From the above it is apparent that Life Cycle factory finding provides a mechanism in which there are many possible ways to specify "where" in the distributed object-oriented environment to look for a factory.

Looking at the string used by the client in line 5 of the example shows how the client of the factory finder tells "what" to look for. In the example, the string "Policy.object interface" means to return a home whose objects support the Policy interface. Requests always require that the "object interface" be specified, but additional optional qualifiers can be passed as well. This allows the client to be more specific with the request when necessary. The following examples are illustrative.

To look for factories which support the Policy interface and whose home is named "PersistentPolicyHome", the following code may be used:

"Policy.object interface/PersistentPolicyHome.object home".

To look for factories which support the Policy interface and whose implementation is named "InsuranceModuleDB2MO::PolicyDB2MO", the following code may be used:

"Policy.object interface/ InsuranceModuleDB2MO::PolicyDB2MO.object implementation.

To look for factories which support the Policy interface and which also support the MyPolicyHome interface (a specialized home), the following code may be used:

"Policy.object interface/MyPolicyHome.factory interface".

From the above it can be seen that Life Cycle factory finding provides a mechanism in which there are many ways to specify "what" kind of factory to look for in the distributed object-oriented environment.

The EJB specification defines the use of JNDI lookup as the correct way to find EJBHomes. That requires that EJBHomes be bound directly into the name space. This may be done by having the EJBHome bound into the name space using the EJBbind utility. Client code then uses hard coded strings (or property values) to define the bootstrap host information and to create the initial context to be used by the application. Once the application has the initial context, JNDI lookup calls can be used to find the EJBHomes. This approach can easily lead to a variety of problems with name conflicts if the approach is to bind everything at some well defined location, such as into the root context. To avoid these name conflicts, a more complex set of name paths must be used in order to segment where the homes are bound. This leads to clients having to have configuration-specific information in order to construct an appropriate name path to find the EJBHome.

The following is a typical example of code used to find an EJBHome. In the example, it is assumed that the EJBbind utility was used to bind the home into the context "host/resources/factories/EJBHomes".

1. // Get the name/port of the bootstrap host (local host will be bootstrap in the example)
2. properties.put(javax.naming.Context.PROVIDER_URL,
3. "iiop:///"
4. // Get the name of the specific "initial context factory"
5. properties.put(javax.naming.Context.INITIAL_CONTEXT_FACTORY,
6. "com.ibm.ejb.cb.runtime.CBCtxFactory);
7. // Get the initial context
8. initialContext=new InitialContext(properties);
9. // Get the Policy home
10. homeAsObject=initialContext. lookup("host/resources/factories/EJBHomes/PolicyHome");
11. policyHome=(PolicyHome) javax.rmi.PortableRemoteObject.narrow(
12. org.omg.CORBA.Object) homeAsObject,
13. PolicyHome.class);

With this approach to locating homes, the concept of "where" is limited to a name path. In the above example, it is assumed that the PolicyHome is being looked for on the bootstrap host because the namepath "host/resources/factories/EJBHomes" is being used. There is no additional abstraction of "where" as there is encapsulated in a factory finder. The concept of "what" is only in the name of the home "PolicyHome". Given the above, there is no possible way to have two PolicyHomes on that host without either (1) binding them as "PolicyHome1" and "PolicyHome2" and have the clients hardcode which one they want, or (2) bind them into different contexts such as "/host/resources/factories/EJBHomes/server/myServer/PolicyHome" and "/host/resources/factories/EJBHomes/ server/myServer2/PolicyHome", and have the clients hard code which one they want. This approach introduces many problems related to configuration and client code dependencies and makes configuration changes difficult to perform without coordination of client code.

Figure 5:
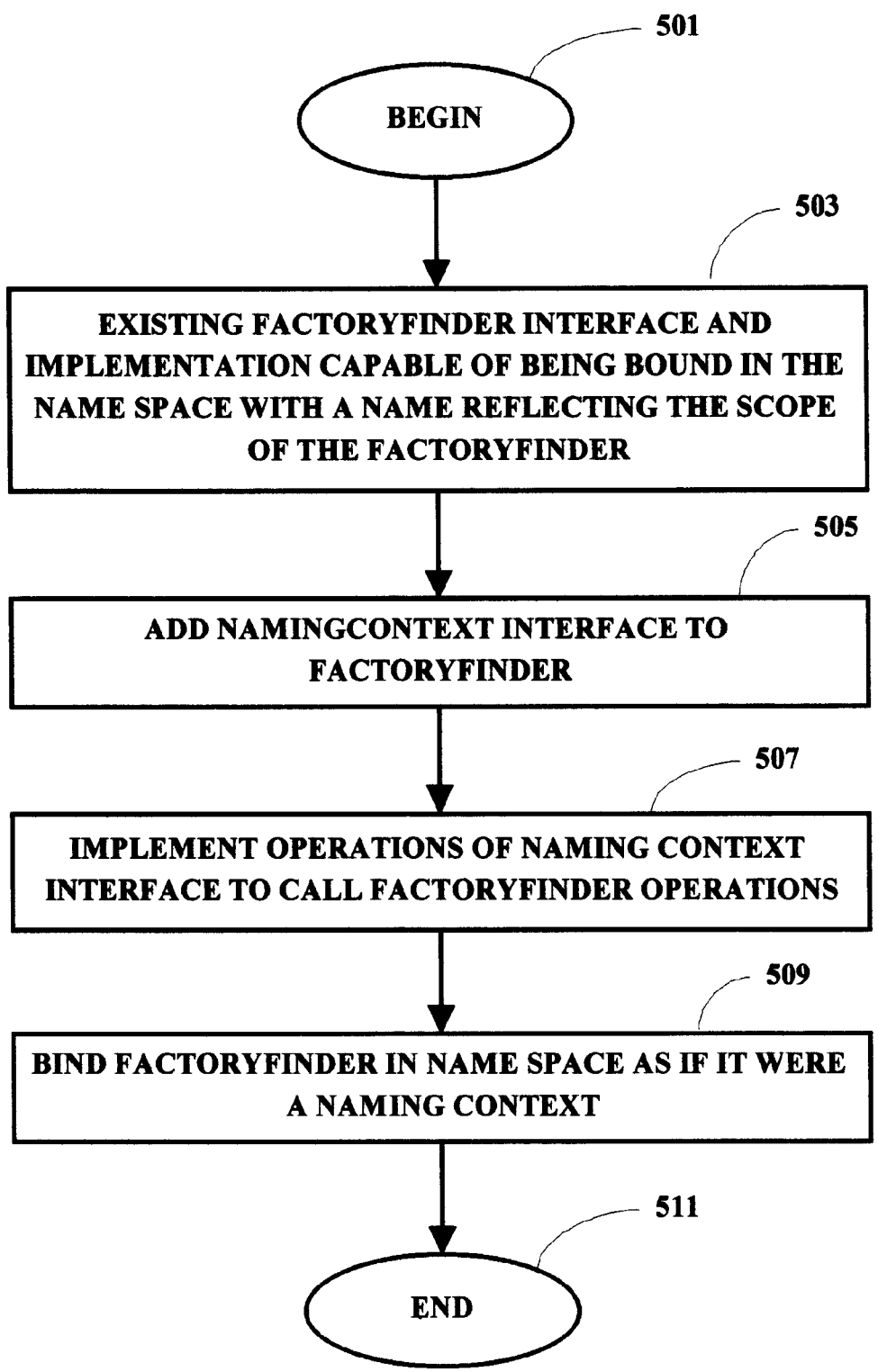
FIG. 5 is a flow chart illustrating an exemplary processing methodology for enabling the use of Life Cycle Factory-Finder objects to find EJBHomes.

In accordance with the present invention, Life Cycle Service FactoryFinder objects are used in finding EJBHomes. The methodology to enable Life Cycle FactoryFinder objects to be used in this way is shown in a flow chart in FIG. 5. Beginning at 501, an existing FactoryFinder interface and implementation 503 is established. That FactoryFinder interface and implementation is capable of being bound into the name space such that its name in the name space is representative of the scope of the distributed domain the FactoryFinder searches. Next, the FactoryFinder is enhanced to support the NamingContext interface 505, thus allowing the FactoryFinder to accept naming requests. Next, operations of the NamingContext interface are implemented to call FactoryFinder operations 507. The FactoryFinder is enhanced so that requests on the NamingContext interface, resolve and resolve_with_string, are simply passed to the corresponding FactoryFinder operations, find_factory and find_factory_from_string. It is noted that the underlying parameter types for the NamingContext and FactoryFinder operations are the same, specifically CosNaming::Name and the String form of a CosNaming::Name. Now that the FactoryFinder supports the NamingContext interface and has an implementation of that interface, the next step 509 binds the FactoryFinder into the name space as if it were really a NamingContext. This is done by using "bind_context" rather than "bind" to add it to the name space. After this is accomplished, the methodology is completed 511, and Life Cycle FactoryFinding has been enabled to be used to find EJBHomes.

With this methodology, the only thing that would change in the EJB code example above would be the string used in the lookup method on line#10. The string would be the combination of the two strings used in the CORBA example in line 2 and line 5. The following examples are illustrative showing what string would be substituted into line 10 to accomplish a particular Home lookup.

To find the EJBHome of Policy objects in my bootstrap host, the following code may be used:

"host/resources/factory-finders/host-scope/Policy.object interface".

To find the EJBHome of persistent Policy objects in workgroup myWG, the following code may be used:

"cell/workgroups/my WG/factory-finders/workgroup-scope/Policy.object interface/ PersistentPolicyHome.object home".

To find the EJBHome of Policy objects which supports the MyPolicyHome interface and is located in myServer which can be on any host, the following code may be used:

"cell/resources/factory-finders/myServer-server-scope/ Policy.object interface/MyPolicyHome.factory interface".

The above strings satisfy the JNDI specification definition of a composite name i.e. a name that crosses namespaces. The first part of the name can be considered part of the CosNaming namespace (e.g. "host/resources/factory-finders/host-scope") and the second part of the name can be considered part of the Life Cycle service name space (e.g. "Policy.object interface/MyPolicyHome.factory interface").

Thus, with the present invention, an EJB client can gain the benefits provided by a Life Cycle service without having to make extensions to the EJB programming model.

In addition, the present invention is also beneficial in a CORBA programming model. In the code example of CORBA factory finding, there are at least two and possibly four remote calls in the four executable lines of code shown. It is noted that the "narrow" calls may or may not need to flow remotely depending upon a variety of factors. With the present invention, the string in line 2 would be extended to include the string from line 5, and lines 3 and 5 could be eliminated. That would leave line 2 (with the additional string data from line 5) and line 6. The result is that the number of remote calls in the example is reduced by one-half thereby significantly enhancing performance.

The method and apparatus of the present invention has been described in connection with a preferred embodiment as disclosed herein. The disclosed methodology may be implemented in many different ways in order to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented partially or totally in program code stored on one of many possible media carriers, or other memory device, from which it may be accessed and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for using Life Cycle Service for finding a collection in a distributed network environment, said method comprising:

enhancing Life Cycle to store a mapping from simple names to parameters required by Life Cycle for finding homes;

providing to Life Cycle a listing of collections which are not also homes;

receiving a request to find a collection, said request being made using a naming interface of a naming service;

enabling QueryEvaluator to request Life Cycle to find said collection by providing a simple name; and enabling a factory finder to search said distributed network environment for both home and non-home collections by using a simple name.

2. The method as set forth in claim 1 wherein said naming interface accepts a name as input.

3. The method as set forth in claim 1 wherein said naming interface supports only one-to-one name-to-object relationships.

4. The method as set forth in claim 1 wherein said factory finder is scoped to a subset of objects within said distributed network domain.

5. The method as set forth in claim 1 wherein said factory finder accepts selection criteria as input.

6. The method as set forth in claim 1 wherein said factory finder service is capable of supporting one-to-many selection criteria-to-object relationships.

7. The method as set forth in claim 1 wherein said processing results in a one-to-many selection of said named objects.

8. The method as set forth in claim 1 wherein said method is effective for finding EJBHomes using said factory finder service.

9. The method as set forth in claim 8 wherein said factory finder service is included within a Life Cycle Service.

10. The method as set forth in claim 1 and further including:

adding a naming context interface to said factory finder; and implementing operations of said naming context interface to call operations of said factory finder.

11. The method as set forth in claim 10 and further including binding said factory finder in name space as a naming context.

12. A storage medium including machine readable coded indicia, said storage medium being selectively coupled to a reading device, said reading device being selectively coupled to processing circuitry, said reading device being selectively operable to read said machine readable coded indicia and provide program signals representative thereof, said program signals being effective for using Life Cycle Service for finding a collection in a distributed network environment, said program signals being selectively operable to accomplish the steps of:

enhancing Life Cycle to store a mapping from simple names to parameters required by Life Cycle for finding homes;

providing to Life Cycle a listing of collections which are not also homes;

receiving a request to find a collection said request being made using a naming interface of a naming service;

enabling QueryEvaluator to request Life Cycle to find said collection by providing a simple name; and enabling a factory finder to search said distributed network environment for both home and non-home collections by using a simple name.

13. A distributed network information processing system comprising:

a server device;

at least one terminal; and a network connection arranged to selectively couple said terminal and said server, said server being responsive to a receipt of a request from said terminal to use Life Cycle Service to find a collection in a distributed network environment, said request being made using a naming interface and a naming service, said server being selectively operable to find said collection by:

enhancing Life Cycle to store a mapping from simple names to parameters required by Life Cycle for finding homes;

providing to Life Cycle a listing of collections which are not also homes;

receiving said request;

enabling QueryEvaluator to request Life Cycle to find said collection in response to said request by providing a simple name; and enabling a factory finder to search said distributed network environment for both home and non-home collections by using said simple name.

* * * * *